United States Patent [19]

Miglierini

[11] 3,950,041

[45] Apr. 13, 1976

[54] ROCK BIT BEARING SYSTEM FOR CARRYING OUT THRUST

[75] Inventor: Raul A. Miglierini, Dallas, Tex.

[73] Assignee: Dresser Industries, Inc., Dallas, Tex.

[22] Filed: Mar. 7, 1975

[21] Appl. No.: 556,239

Related U.S. Application Data

[63] Continuation of Ser. No. 396,622, Sept. 12, 1973, abandoned.

[52] U.S. Cl. .................. 308/8.2; 308/174; 175/372
[51] Int. Cl.² .......................................... F16C 19/00
[58] Field of Search ............ 308/8.2; 175/372, 371, 175/228

[56] References Cited
UNITED STATES PATENTS

| | | | |
|---|---|---|---|
| 2,658,724 | 11/1953 | Arps | 308/8.2 |
| 3,303,898 | 2/1967 | Bercaru | 308/8.2 |
| 3,601,456 | 8/1971 | Becker | 308/207 R |
| 3,620,580 | 11/1971 | Cunningham | 308/8.2 |
| 3,663,073 | 5/1972 | Bronson | 308/8.2 |
| 3,720,274 | 3/1973 | McCallum | 308/8.2 |

*Primary Examiner*—Robert R. Song
*Assistant Examiner*—Richard A. Bertsch
*Attorney, Agent, or Firm*—Eddie E. Scott

[57] ABSTRACT

A rotatable cutter is mounted upon the bearing pin of a rotary rock bit. The cutter contacts and disintegrates earth formations during the drilling of an earth borehole thereby imposing a thrust load on the cutter. The thrust load consists of an out thrust load component substantially parallel to the axis of cutter rotation and a radial thrust load component substantially perpendicular to the axis of the cutter rotation. Substantially the entire out thrust load component is transmitted from the cutter through a ball bearing raceway on the interior surface of the cutter to the ball bearings and from the ball bearings to a ball bearing raceway on the bearing pin. The ball bearing raceways on the cutter and the bearing pin extend a substantial distance on either side of the axial axes of the ball bearings.

13 Claims, 5 Drawing Figures

ROCK BIT BEARING SYSTEM FOR CARRYING OUT THRUST

This is a continuation of application Ser. No. 396,622 filed 9/12/73, now abandoned.

BACKGROUND OF THE INVENTION

The present invention relates to the art of earth boring and more particularly to an improved bearing system for a rotary rock bit.

A rotary rock bit is adapted to be connected as the lower member of a rotary drill string. As the drill string is rotated, the bit contacts and disintegrates the formations to form an earth borehole. The rotary rock bit includes at least one bearing pin that extends angularly downward from the main body of the bit. A cone cutter is mounted upon the bearing pin and adapted to rotate thereon. Individual bearing systems promote rotation of the cone cutter. These bearing systems have traditionally been roller bearings, ball bearings, friction bearings, or a combination of the aforementioned bearings. The cone cutters include cutting structure on their outer surfaces that serves to disintegrate the formation as the bit is rotated.

In addition to the rotational forces, the bit is subjected to a thrust load during operation. The weight of the drill string and the downward force applied by the rotary drill equipment apply a substantial thrust load upon the rotary rock bit. The thrust load is divided into an out thrust component substantially parallel to the axis of cutter rotation and a radial thrust component substantially perpendicular to the axis of cutter rotation.

In prior art earth boring bits, the out thrust component is taken primarily by a thrust button in the nose of the cone cutter that rotates against a hard face surface on the end of the bearing pin and a thrust flange surface on the inner surface of the cone that rotates against a thrust flange surface on the bearing pin, and secondarily by the ball bearing system. Prior art rotary bits have experienced early failure because of their inability to support the extensive thrust loading. The ball raceways and ball bearings have not been sufficient to effectively carry the out thrust component of the thrust load. The size of the ball bearings was limited by the space available in the cutter shell and on the bearing pin. The use of friction bearings to carry the out thrust load increased the manufacturing costs and resulted in the generation of heat in the bearing area.

DESCRIPTION OF PRIOR ART

In U.S. Pat. No. 3,720,274 to H. F. McCallum, patented Mar. 13, 1973, an earth boring bit thrust bearing is shown. Intermediate thrust elements are positioned between the cutters and the bearing pins of an earth boring bit. Each intermediate thrust element is located between a thrust surface on a bearing pin and a thrust surface on an associated cutter. The intermediate thrust elements aid stabilization of the rotating cutter, promote cutter rotation, and extend the lifetime of the bit.

In U.S. Pat. No. 3,620,580 to R. A. Cunningham, patented Nov. 16, 1971, a rock drill with increased bearing life is shown. The invention is applicable to all types of rock drills in which a rolling cutter is rotatably mounted on a fixed shaft member with an interposed ball bearing and is especially useful in the newer rock bits provided with a lubricant system and a highly effective seal. Heretofore, the ball bearing has served (in part) as a means for transmitting loads from cutter to shaft including both radial loads and axial loads. The inventor has modified the bearing structure in such a way that at least outward thrust loads and preferably radial loads as well no longer pass through the balls; i.e., from the raceways of the cone through the balls to the corresponding raceway on the bearing pin. This is accomplished by relieving or deepening either or both raceways, preferably in a non-uniform fashion so that the deepest relief is in the outboard portion of the bearing pin raceway or the inboard portion of the cone raceway or both. One or more pairs of transversely extending friction bearing surfaces are disposed on the pair of members to absorb such thrust. The important effect of this improvement is the reduction or elimination of spalling of the ball raceways thus eliminating metal particles that otherwise could find their way between the confronting surfaces of other bearing members where they are likely to wreck havoc. The overall effect is the increase of life of the bearing making it last as long as the cutting structure of the bit.

SUMMARY OF THE INVENTION

The present invention provides an improved bearing system for a rotary rock bit. In addition to rotatably locking the cutter of the bit upon the bearing pin, the improved bearing system supports substantially the entire out thrust load imposed upon the bit. The out thrust load is transmitted from the rotatable cutter to the ball bearings through a ball bearing raceway on the interior of the cutter. The out thrust load is transmitted from the ball bearings to the bearing pin through a ball bearing raceway on the bearing pin. The ball bearing raceways extend a substantial distance on either side of the axial axes of the ball bearings. The above and other features and advantages of the present invention will become apparent from a consideration of the following detailed description of the invention when taken in conjunction with the drawings.

DETAILED DESCRIPTION OF THE DRAWINGS

Figure 1:
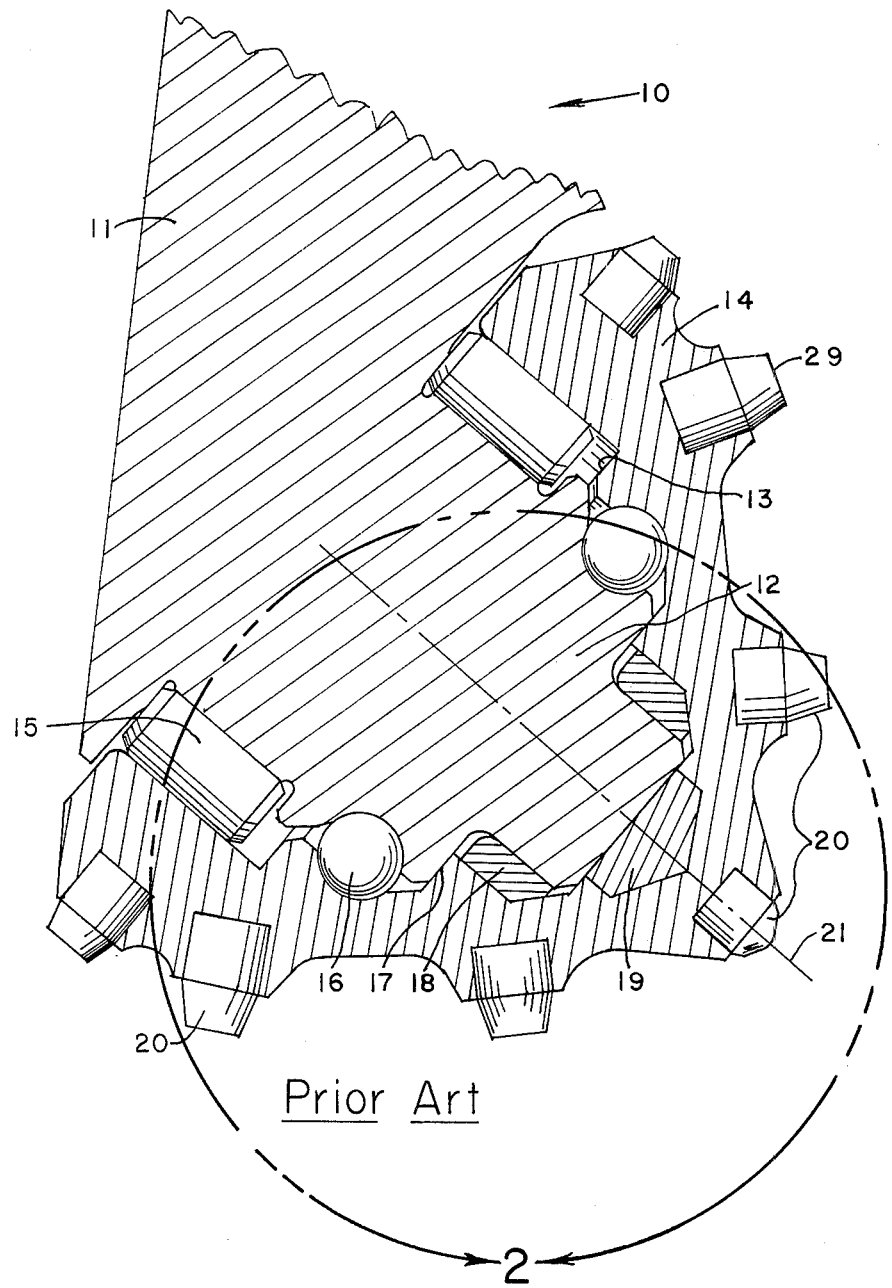
FIG. 1 illustrates an earth boring bit of the prior art.

Referring now to FIG. 1, an earth boring bit of the prior art is illustrated and generally designated by the reference number 10. The bit 10 includes an arm 11. The lower portion of the arm 11 forms a bearing pin 12 that projects into a recess 13 formed in the associated rotary cone cutter 14. The cutter 14 is journaled on bearing pin 12 by roller bearings 15, ball bearings 16, thrust flange 17, friction bearing 18, and thrust button 19. A multiplicity of inserts 20 are mounted in the cutter 14 to contact and disintegrate the earth formations. The cutter 14 rotates about bearing pin 12 thereby establishing an axis of cutter rotation 21.

Figure 2:
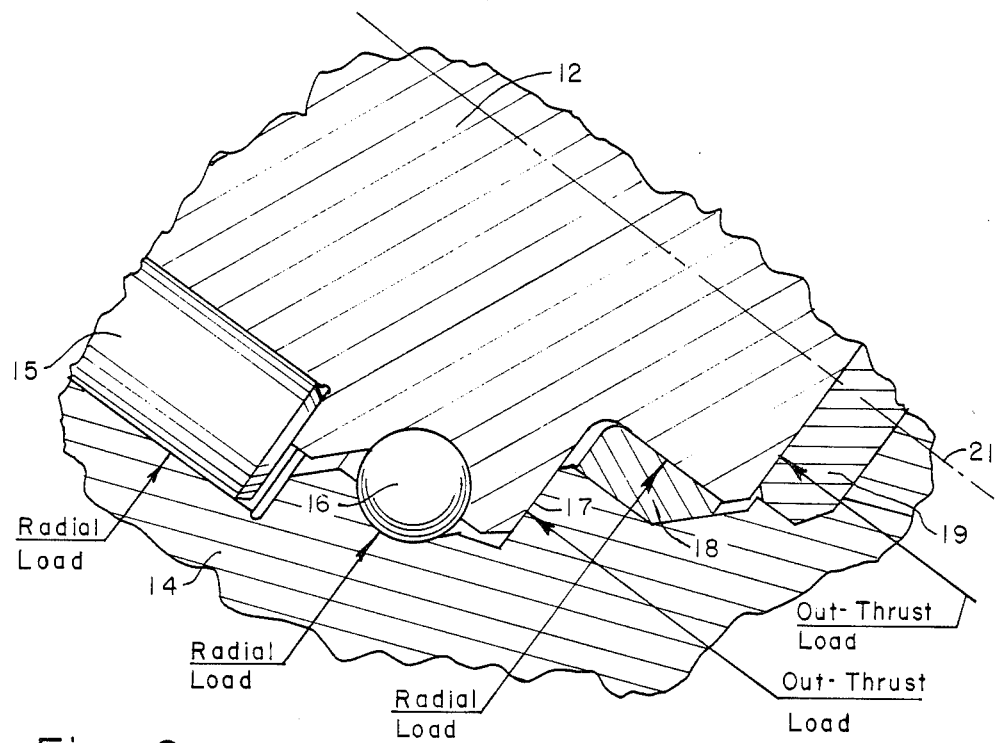
FIG. 2 is an enlarged view of a portion of the bit shown in FIG. 1.

Referring now to FIG. 2, an enlarged view of a portion of the bearing pin 12 and the cutter 14 of bit 10 is shown. The prior art earth boring bits support the out thrust load with the thrust button 19 and the thrust flange 17. The ball bearings 16 may take a small portion of the out thrust load. The radial load is carried by the roller bearings 15, the ball bearings 16, and the friction bearing 18. The thrust flange 17 takes up a portion of the space available for the bearings and limits the size of the ball bearings to relatively a small size. The friction bearings 18 and 19 that are used to support the out thrust load increase the manufacturing costs and generate heat in the bearing area during the drilling operation. The ball bearings 16 are not fully contained for supporting axial loads and the ball bearing can only support a limited portion of the out thrust load.

Figure 3:
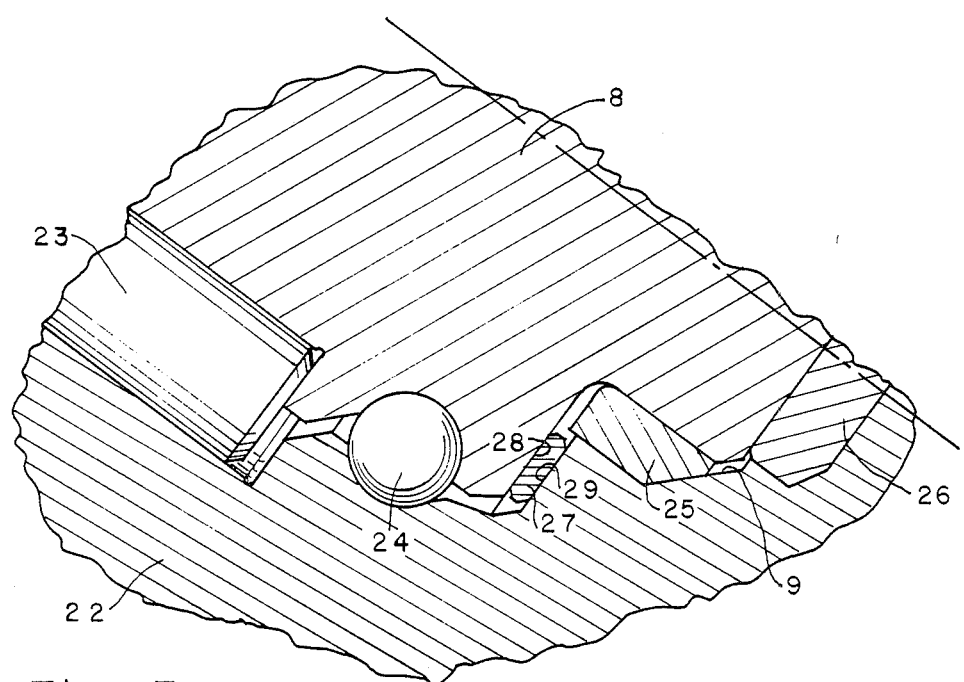
FIG. 3 illustrates another prior art earth boring bit.

Referring now to FIG. 3, the bearing systems of another prior art earth boring bit are shown. The bearing pin 8 projects into a recess 9 formed in cutter 22. The cutter 22 is journaled on bearing pin 8 by roller bearings 23, ball bearings 24, the friction bearing 25, and thrust button 26. An intermediate element 27 is positioned in a recess 9 between a thrust surface 28 on bearing pin 8 and a thrust surface 29 on cutter 22. The thrust element 27 is not affixed to the bearing pin 8 or to the cutter 22 but is allowed to float freely around the bearing pin 8. The intermediate element 27 forms an annular ring that completely encircles the bearing pin 8.

Figure 4:
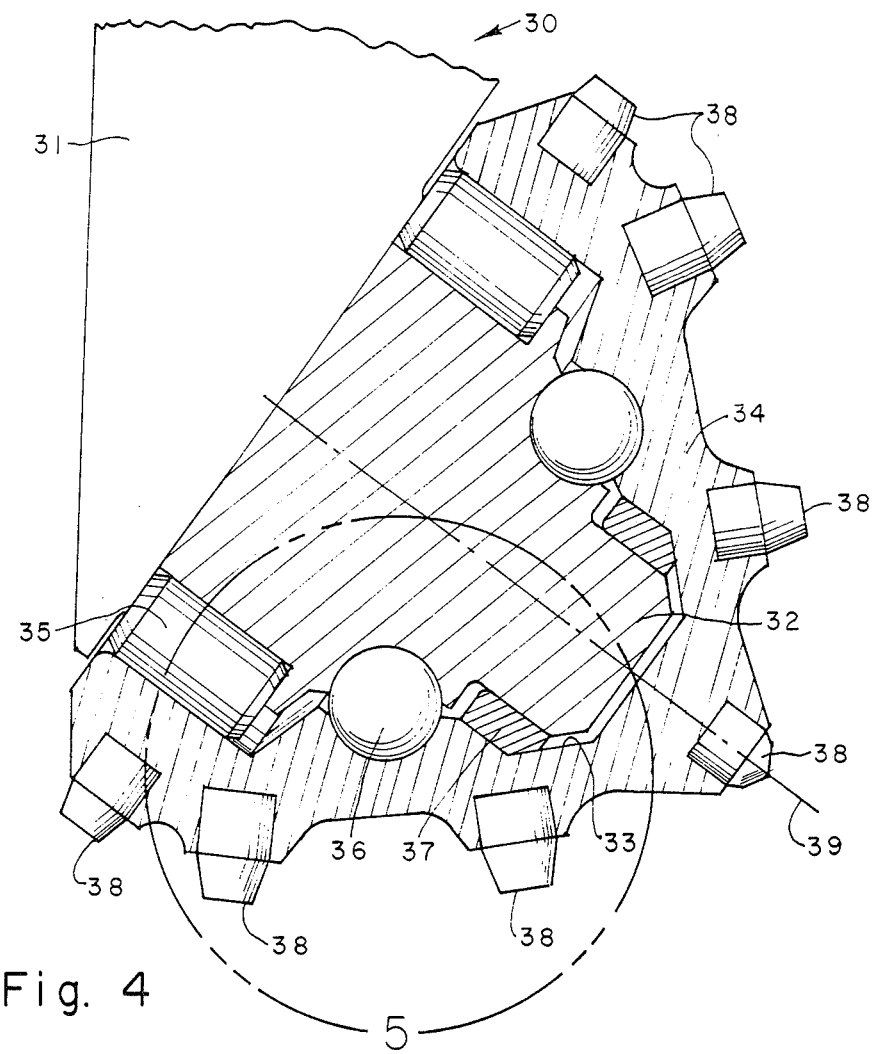
FIG. 4 illustrates an earth boring bit constructed in accordance with the present invention.

Referring now to FIG. 4 an earth boring bit constructed in accordance with the present invention is illustrated and generally designated by the reference number 30. The bit 30 includes an arm 31. The lower portion of the arm 31 forms a bearing pin 32 that projects into a recess 33 formed in the associated rotary cone cutter 34. The cutter 34 is journaled on bearing pin 32 by roller bearings 35, ball bearings 36, and a friction bearing 37. A multiplicity of inserts 38 are mounted in the cutter 34 to contact and disintegrate the earth formations. The cutter 34 rotates about bearing pin 32 thereby establishing an axis of cutter rotation 39. When the cutters contact the formations during the drilling operation a thrust load is imposed upon the cutter. The thrust load is divided into an out thrust load component that is substantially parallel to the axis of cutter rotation 39 and a radial thrust load component that is substantially perpendicular to the axis of cutter rotation 39.

Figure 5:
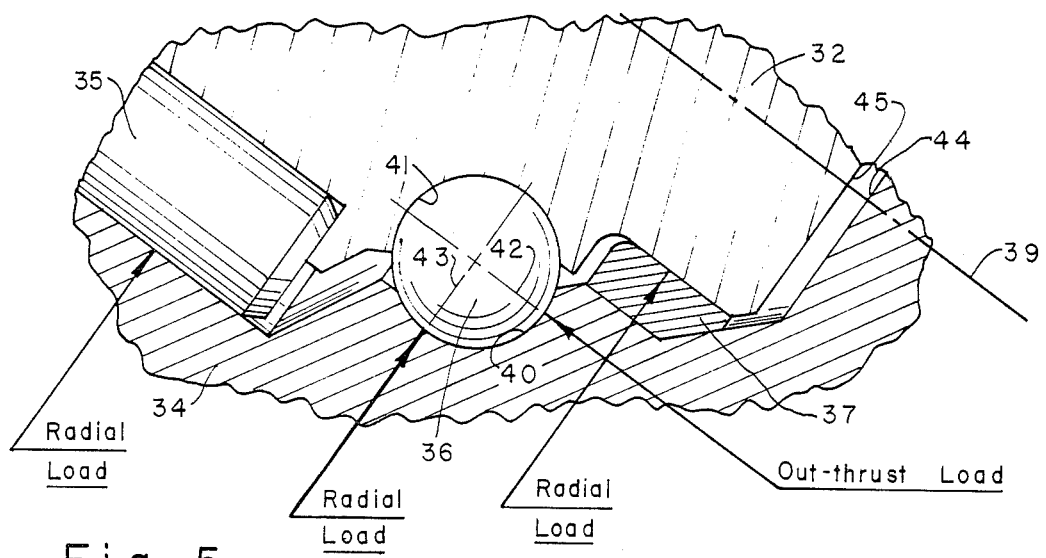
FIG. 5 is an enlarged view of a portion of the bit shown in FIG. 4.

Referring now to FIG. 5 an enlarged view of a portion of the bearing pin 32 and the cutter 34 of bit 30 is shown. The out thrust load component of the thrust load acts parallel to the axis of cutter rotation 39 and the radial thrust load component of the thrust load acts perpendicular to the axis of cutter rotation 39. The radial load is transmitted from the cutter 34 to the roller bearings 35, the ball bearings 36 and the friction bearing 37 and from the roller bearings 35, the ball bearings 36, and the friction bearing 37 to the bearing pin 32. The entire out thrust load is transmitted from the cutter 34 to the ball bearings 36 and from the ball bearings 36 to the bearing pin 32. A ball bearing raceway 40 on the cutter 34 contains the ball bearings 36. The ball bearing raceway 40 extends a substantial distance on either side of the axial axis 42 of an individual ball bearing that extends through the center of the ball bearing parallel to the axis of cutter rotation 39. The ball bearing raceway 40 extends at least 5° on each side of the axial axis 42. A ball bearing raceway 41 on bearing pin 32 contains the ball bearings 36. The ball bearing raceway 41 extends a substantial distance on either side of the axial axis 42. The ball bearing raceway 41 extends at least 5° on each side of the axial axis 42. A radial axis 43 extends through the center of an individual ball bearing substantially perpendicular to the axis of cutter rotation 39. A surface 44 in the nose of cutter 34 is spaced from a surface 45 on the end of the bearing pin 32.

The bit 30 constructed in accordance with the present invention includes ball bearing raceways 40 and 41 that are effectively utilized to carry all of the out thrust component of the thrust load from the cutter 34 to the bearing pin 32. It is to be understood that the present invention encompasses a bearing system wherein a bearing element other than the ball bearings, such as a thrust button, takes a relatively small portion of the out thrust load. It will be appreciated that the other bearing element may wear during operation to a greater extent than the ball bearing element and the ball bearing element will gradually take an additional portion of the out thrust load.

The present invention increases overall bearing efficiency and bearing life and utilizes the space taken by the ball raceways as a load carrying element rather than relegating the ball bearings to simply retaining the cones on the bearing pin. The present invention eliminates friction bearing thrust surfaces which presently serve as heat generators in the bearing assembly. Manufacturing costs are reduced by eliminating the friction bearing thrust surfaces in the bearing assembly. The elimination of the necessity for friction thrust surfaces allows the utilization of the space previously used for an inner flange for purposes of a larger diameter ball, and thus further increasing the bearing capacity of the ball race. It should be noted that the strength of a ball bearing and the capacity of the bearing assembly increases exponentially with increasing ball diameter. The elimination of all friction type thrust bearings reduces the heat generated during the bearing operation. It also reduces the manufacturing costs of the bearing assembly.

The embodiments of the invention in which an exclusive property or privilege is claimed are defined as follows:

1. An earth boring bit that encounters a radial load and an out thrust load during drilling, comprising:
   a bit body having a bearing pin;
   a rotatable cone cutter mounted over said bearing pin, said cone cutter having a cone mouth, an internal cavity that projects from said cone mouth and an axis of cutter rotation;
   a first bearing means in said internal cavity for carrying a portion of said radial load;
   a second bearing means in said cavity for carrying a portion of said radial load; and
   a third bearing means in said cavity located between said first bearing means and said second bearing means for carrying substantially all of said out thrust load and locking the cone cutter on the bearing pin, said third bearing means comprising a series of ball bearings between said bearing pin and said rotatable cone cutter for carrying substantially all of said out thrust load, said ball bearings having axial axes substantially parallel to said axis of cutter rotation, a ball bearing raceway on said cutter for containing said ball bearings, said ball bearing raceway extending a substantial distance on either side of said axial axes, and a ball bearing raceway on said bearing pin for containing said ball bearings, said ball bearing raceway extending a substantial distance on either side of said axial axes.

2. The bit improvement of claim 1 wherein said ball bearing raceway on said cutter extends at least 5° on either side of said axial axes.

3. The bit improvement of claim 1 wherein said ball bearing raceway on said bearing pin extends at least 5° on either side of said axial axes.

4. In an earth boring bit that includes a bit body, a bearing pin extending from said bit body, and a rotatable cone cutter mounted on said bearing pin, said cone cutter having a cone mouth and an internal cavity that projects from said cone mouth, with said rotatable cone cutter establishing an axis of cutter rotation, the improvement comprising:
first bearing means for carrying a first portion of radial loads imposed upon said cutter, said first bearing means comprising a series of roller bearings that are positioned immediately adjacent said cone mouth and project into said internal cavity;
second bearing means for carrying a second portion of radial load imposed upon said cutter; and
third bearing means located between said first bearing means and said second bearing means for carrying substantially all of the out thrust loads imposed upon said cutter, said third bearing means comprising a series of ball bearings between said bearing pin and said rotatable cone cutter that carry substantially all of the out thrust loads imposed on said cutter, said ball bearings having axial axes substantially parallel to said axis of cutter rotation, a ball bearing raceway on said cutter for containing said ball bearings, said ball bearing raceway extending a substantial distance on either side of said axial axes, and a ball bearing raceway on said bearing pin for containing said ball bearings, said ball bearing raceway extending a substantial distance on either side of said axial axes.

5. The bit improvement of claim 4 wherein said ball bearing raceway on said cutter extends at least 5° on either side of said axial axes.

6. The bit improvement of claim 5 wherein said ball bearing raceway on said bearing pin extends at least 5° on either side of said axial axes.

7. An earth boring bit that encounters a radial load and an out thrust load during drilling, comprising:
a bit body having a bearing pin;
a rotatable cone cutter, said cone cutter having an internal cavity mounted over said bearing pin, an open cone mouth and an axis of cutter rotation;
a series of roller bearings that project from said cone mouth into said cavity for carrying a portion of said radial load;
a friction bearing means in said cavity for carrying a portion of said radial load; and
a third bearing means in said cavity located between said first bearing means and said second bearing means for carrying substantially all of said out thrust load, said third bearing means comprising a series of ball bearings between said bearing pin and said rotatable cone cutter that carry substantially all of said out thrust load, said ball bearings having axial axes substantially parallel to said axis of cutter rotation, a ball bearing raceway on said cutter for containing said ball bearings, said ball bearing raceway extending a substantial distance on either side of said axial axes, and a ball bearing raceway on said bearing pin for containing said ball bearings, said ball bearing raceway extending a substantial distance on either side of said axial axes.

8. The bit improvement of claim 7 wherein said ball bearing raceway on said cutter extends at least 5° on either side of said axial axes.

9. The bit improvement of claim 8 wherein said ball bearing raceway on said bearing pin extends at least 5° on either side of said axial axes.

10. In an earth boring bit that includes a bit body, a bearing pin extending from said bit body, a rotatable cutter mounted on said bearing pin with said rotatable cutter establishing an axis of cutter rotation, and a series of ball bearings between said bearing pin and said cutter with said ball bearings having a radial axis substantially perpendicular to said axis of cutter rotation and an axial axis substantially parallel to said axis of cutter rotation wherein said cutter is adapted to contact and disintegrate formations thereby imposing a radial load on said cutter substantially perpendicular to said axis of cutter rotation and imposing an out thrust load on said cutter substantially parallel to said axis of cutter rotation, the improvement comprising:
an open cone mouth in said rotatable cutter;
an internal cavity in said rotatable cutter that projects from said open cone mouth;
a series of roller bearings in said internal cavity between said bearing pin and said cutter for carrying a portion of radial load, said roller bearings projecting into said internal cavity from said cone mouth;
a ball bearing raceway on said cutter for containing said ball bearings and transmitting the entire out thrust load from said cutter to said ball bearings, said ball bearing raceway extending a substantial distance on either side of said axial axis; and
a ball bearing raceway on said bearing pin for containing said ball bearings and receiving the entire out thrust load from the ball bearings, said ball bearing raceway extending a substantial distance on either side of said axial axis.

11. The bit improvement of claim 10 wherein said ball bearing raceway on said cutter extends at least 5° on either side of said axial axis.

12. The bit improvement of claim 11 wherein said ball bearing raceway on said bearing pin extends at least 5° on either side of said axial axis.

13. The bit improvement of claim 12 including a surface in the nose of said cutter spaced from a surface on the end of said bearing pin.

* * * * *